US012599152B2

(12) United States Patent (10) Patent No.: US 12,599,152 B2
Chen et al. (45) Date of Patent: Apr. 14, 2026

(54) PREPARATION OF COMPOUND RUMEN BYPASS POLYUNSATURATED FATTY ACID POWDER AND USE THEREOF

(71) Applicant: XIAMEN HUISON BIOTECH CO., LTD, Xiamen (CN)

(72) Inventors: Liyi Chen, Xiamen (CN); Huichang Zhong, Xiamen (CN); Shuirong Chen, Xiamen (CN)

(73) Assignee: XIAMEN HUISON BIOTECH CO., LTD, Xiamen (CN)

( * ) Notice: Subject to any disclaimer, the term of this patent is extended or adjusted under 35 U.S.C. 154(b) by 499 days.

(21) Appl. No.: 18/004,116

(22) PCT Filed: Aug. 20, 2021

(86) PCT No.: PCT/CN2021/113654
§ 371 (c)(1),
(2) Date: Jan. 3, 2023

(87) PCT Pub. No.: WO2022/068459
PCT Pub. Date: Apr. 7, 2022

(65) Prior Publication Data
US 2023/0263191 A1 Aug. 24, 2023

(30) Foreign Application Priority Data

Sep. 29, 2020 (CN) .......................... 202011048108.X

(51) Int. Cl.
| | |
|---|---|
| A23K 20/158 | (2016.01) |
| A23K 10/30 | (2016.01) |
| A23K 20/163 | (2016.01) |
| A23K 20/174 | (2016.01) |
| A23K 20/189 | (2016.01) |
| A23K 40/10 | (2016.01) |
| A23K 40/30 | (2016.01) |
| A23K 50/10 | (2016.01) |

(52) U.S. Cl.
CPC ............ *A23K 20/158* (2016.05); *A23K 10/30* (2016.05); *A23K 20/163* (2016.05); *A23K 20/174* (2016.05); *A23K 20/189* (2016.05); *A23K 40/10* (2016.05); *A23K 40/30* (2016.05); *A23K 50/10* (2016.05)

(58) Field of Classification Search
CPC .... A23K 20/158; A23K 10/30; A23K 20/163; A23K 20/174; A23K 20/189; A23K 40/10; A23K 40/30; A23K 50/10; A23K 20/111; A23K 20/28; A23K 40/35; A23K 10/37; Y02P 60/87; A01K 67/02; Y10S 426/807
USPC .............................................................. 426/2
See application file for complete search history.

(56) References Cited

U.S. PATENT DOCUMENTS

| | | | | |
|---|---|---|---|---|
| 4,935,250 A | * | 6/1990 | Cox ........................ | A23K 40/30 426/94 |
| 5,314,692 A | * | 5/1994 | Haarasilta ............ | A61K 38/465 435/177 |
| 2020/0370078 A1 | * | 11/2020 | Chen ..................... | C12P 7/6434 |

FOREIGN PATENT DOCUMENTS

| | | | | |
|---|---|---|---|---|
| CN | 104719670 A | | 6/2015 | |
| CN | 104938791 A | | 9/2015 | |
| CN | 105053569 A | | 11/2015 | |
| CN | 106572682 A | | 4/2017 | |
| CN | 109082381 A | | 12/2018 | |
| CN | 110074256 A | * | 8/2019 | ............ A23K 10/18 |
| CN | 110100959 A | | 8/2019 | |
| CN | 110235989 A | | 9/2019 | |
| CN | 110692821 A | | 1/2020 | |
| CN | 110771742 A | | 2/2020 | |
| CN | 110800871 A | | 2/2020 | |
| CN | 111011621 A | | 4/2020 | |
| CN | 112167165 A | | 1/2021 | |
| GB | 2240702 A | * | 8/1991 | ............... A23D 9/05 |
| JP | 2000004802 A | * | 1/2000 | ............ A23K 10/14 |
| WO | WO-0200028 A1 | * | 1/2002 | ........... A23C 9/1528 |
| WO | WO-2010006765 A1 | * | 1/2010 | ............... C11B 1/06 |
| WO | 2020074488 A1 | | 4/2020 | |

OTHER PUBLICATIONS

International search report of PCT/CN2021/113654.

* cited by examiner

*Primary Examiner* — Erik Kashnikow
*Assistant Examiner* — Bhaskar Mukhopadhyay

(57) ABSTRACT

A preparation of a high-conversion compound rumen bypass polyunsaturated fatty acid powder and the use thereof. The preparation comprises: adsorbing a polyunsaturated fatty acid oil by means of an adsorbent under vacuum conditions, and compounding a water-soluble antioxidant and an enzyme for promoting digestion and absorption to form a mixed powder; uniformly mixing and granulating the mixed powder by using a colloid or flour, and carrying out one-layer fixed coating by using a polysaccharide; and performing rumen bypass coating of the one-layer coating granule by using a fat powder or of a monoglyceride and a diglyceride by using a coating machine.

15 Claims, No Drawings

PREPARATION OF COMPOUND RUMEN BYPASS POLYUNSATURATED FATTY ACID POWDER AND USE THEREOF

TECHNICAL FIELD

The present invention relates to the field of coating with polyunsaturated fatty acid oils, and the field of food and feed, and in particular to preparation of a rumen bypass polyunsaturated fatty acid powder which can increase conversion of polyunsaturated fatty acids ruminant milk formed by compounding n–3 and n–6 polyunsaturated fatty acids in a certain ratio and performing secondary rumen bypass coating, and to use thereof.

BACKGROUND

Polyunsaturated fatty acids, precursors of lipid mediators, are essential fatty acids and play an important role in the structure and function of the cell membrane and a crucial role in the development of the brain, vision and nerves and in maintaining the cardiovascular and cerebrovascular health. They are typically classified into omega-3 and omega-6. Major n–6 polyunsaturated fatty acids include linoleic acid, arachidonic acid (ARA), and the like. Major n–3 polyunsaturated fatty acids include linolenic acid, docosahexaenoic acid (DHA), eicosapentaenoic acid (EPA), and the like. DHA plays a nutritive role in promoting the development of the nervous system, improving the brain's health and mental performance, promoting the development of the visual and nervous systems, preventing vision loss and improving cell membrane function and also a positive role in the immune system and reducing inflammation in the organism. It is beneficial for improving the constitution. ARA is the most abundant and widely distributed polyunsaturated fatty acid in the human body. Particularly, in the brain and nervous tissues, ARA generally makes up 40-50% of single PUFAs, and even up to 70% in nerve endings. The ARA content of blood plasma in a normal human is also up to 400 mg/L. As an essential fatty acid for the human body, it has biological activity essential for living organisms which is not possessed by other substances, and plays a positive role in reducing the incidence and mortality of heart diseases, preventing and treating cancer, ameliorating schizophrenia and reducing inflammation, particularly in the intelligence development in infants and in the retina.

DHA and ARA are natural components in breast milk, and their contents are somewhere between 0.06% and 1.4%, and 0.19% and 1.56%, respectively. Zhu min et al. reported that DHA and ARA are present in the form of triglyceride and phospholipid in breast milk: triglyceride, as the predominant form, accounts for 98%, phospholipid for 1% and unsaponifiable lipids for 1%. The DHA and ARA absorbed by infants are mainly in triglyceride form. Existing products containing DHA and ARA supplements for children, particularly milk products for infants and children, on the market are achieved by adding additional DHA oil and ARA oil or oil microcapsule powders. In recent years, *Schizochytrium* or its products were used in dairy farming to obtain natural DHA milk or natural ARA milk. For example, in patent ZL201010281458.0, after cows were fed with a coated *Schizochytrium* powder comprising 10% DHA for 21 d, the DHA content of milk was 197.16 mg/L; in patent CN109082381A, by adjusting the *Schizochytrium* fermentation formula, a high-protein rumen bypass *Schizochytrium* powder comprising 20% DHA was produced by one-step fermentation, and after cows were fed with it for 75 d, the DHA content of the free-range group's milk was 25.5 mg/100 g, and that of the captive group's milk was 28.5 mg/100 g; in patent CN110800871A, cows were fed directly with a *Schizochytrium* fermentation product, and the DHA content of the milk obtained after 30 d of feeding was 227 mg/L (i.e, 22.7 mg/100 g); in patent CN110074256A, the cell walls of wet cells of fungi such as *Mortierella* and *Schizochytrium* were broken by using a homogenizer or sand mill; sodium caseinate and glucose syrup and the like were used as wall materials to coat the cells first, and then shellac and acrylic resin II and the like were used as rumen bypass protecting agents for secondary fluidized bed coating; cows were fed with the obtained cell powder, and the DHA content of milk reached a maximum of 22.3 mg/100 mL, or the ARA content reached a maximum of 28.9 mg/100 mL; however, the DHA or ARA content of the cell powder is not explicitly showed in the patent; in patent CN1110111621A, after the cell walls of *Schizochytrium* were broken with an enzyme, sodium starch octenyl succinate, whey protein and sodium caseinate and the like were used as main wall materials for primary coating an drying, and ethanol-dissolved polyacrylic resin and ethyl cellulose solution were used for secondary coating; cows were fed with the obtained cell powder (the DHA content was 13-17%), and the DHA content of milk reached a maximum of 34.23 mg/100 g; in patent CN110100959A, sodium caseinate, whey powder and modified starch were used as membrane-forming agents, and maltodextrin and glucose were used as fillers; after 40% DHA oil or ARA oil were homogenized and used to perform spraying, shellac and acrylic resin II and the like were used as rumen bypass protecting agents for secondary fluidized bed coating to obtain an unsaturated fatty acid powder; the unsaturated fatty acid content of the milk obtained after cows were fed with the powder reached a maximum of 19.1 mg/100 mL; however, the DHA or ARA content of the unsaturated fatty acid powder is not explicitly showed in the patent. In the patents described above, preparation processes such as cells, secondary-coating wall-broken cells, oil homogenization and secondary coating were used to obtain products rich in polyunsaturated fatty acids such as DHA and ARA for feeding cows. The primary coating mainly involves use of sodium starch octenyl succinate, whey protein and sodium caseinate and the like as main wall materials, and the secondary coating mainly involves use of shellac and acrylic resin II and the like as rumen bypass protecting agents or ethanol-dissolved polyacrylic resin and ethyl cellulose solution as rumen bypass coating solutions. The use of resin involves use of organic solvents such as ethanol to dissolve the resin, which may lead to organic solvent residues. Moreover, the use of the expensive coating wall materials such as food-grade whey powder and sodium caseinate and the like will increase the production costs.

The research work of Wang yongkang et al. shows that n–3 and n–6 polyunsaturated fatty acids are important for cows' health; n–6 fatty acids are precursors of 2-series prostaglandins and can make female cows be in estrus more quickly and mate again, and n–3 fatty acids can suppress the synthesis of 2-series prostaglandins at the early stage of female cows' pregnancy, reduce embryo loss and increase pregnancy rate. To improve the maternal health of ruminants, it is particularly important to increase the polyunsaturated fatty acid levels in them. This also advantageously makes milk rich in n–3 and n–6 polyunsaturated fatty acids and increases the conversion of polyunsaturated fatty acids in ruminant milk.

DISCLOSURE OF THE INVENTION

The present invention is intended to provide for ruminants a compound rumen bypass high-conversion polyunsaturated fatty acid powder which can increase the polyunsaturated fatty acid content, such as the DHA content and ARA content, of butterfat and milk of ruminants, and to provide preparation and use thereof.

The compound high-conversion compound rumen bypass polyunsaturated fatty acid powder provided by the present invention is prepared by using a method comprising the following steps:

1) dissolving and mixing uniformly DHA oil, ARA oil and an oil-soluble antioxidant system to obtain a mixed oil;

2) spraying the mixed oil into an adsorbent under vacuum for adsorption;

3) after complete adsorption, adding a water-soluble anti-oxidant and an enzyme for promoting digestion and absorption of unsaturated fatty acids, and uniformly mixing the mixture to form a mixed powder;

4) adding an adhesive to the mixed powder for adhesion, granulating and then drying to obtain core pellets;

5) coating the core pellets with a coating material solution to form a first rumen bypass coating on the granule surface; and 6) mixing uniformly the coated core pellets with a dissolved outer coating wall material, cold spraying, drying and sizing to form fixed granules to obtain a compound rumen bypass polyunsaturated fatty acid powder finished product.

In step 1) of the method, a ratio, by weight, of DHA to ARA is 3:1 to 1:3;

the DHA oil is derived from oils of animal and plant origin, such as fish oil, *Nannochloropsis, Schizochytrium* oil, *Crypthecodinium cohnii* oil and *Ulkenia amoeboida* oil;

the ARA oil is derived from oils of animal and plant origin, such as *Mortierella, Porphyridium purpureum* and *Chlorella;* the oil-soluble antioxidant system plays a protective role mainly in the processing of unsaturated fatty acids, and specifically can be one of or a mixture of more of natural mixed tocopherol, lecithin, rosemary and ascorbyl palmitate;

the oil-soluble antioxidant system weighs 0.1-0.2% of the total weight of the DHA oil and ARA oil, and may specifically weigh 0.125% or 0.188%;

the dissolving and uniform mixing are carried out at room temperature.

In step 2), the degree of vacuum may specifically be −0.06 MPa to −0.1 MPa;

the adsorbent includes one of or a mixture of more of zeolite powder, attapulgite, sepiolite, diatomite, activated carbon, white carbon black, vermiculite, montmorillonite powder, bentonite, activated carbon, corncob powder, corn starch, soybean fine powder, wheat germ powder, bran, chaff, defatted rice bran and alfalfa powder;

a ratio, by weight, of the adsorbent to the oils may be 0.6:1 to 1:1, and may specifically be 0.8:1 or 0.7:1 or 0.9:1;

the adsorption can be carried out for a period of 0.5-3.0 h.

In step 3), the water-soluble antioxidant is mainly used for protecting unsaturated fatty acids from being oxidized in ruminants and also promoting their conversion in ruminants, and specifically can be one of or a mixture of more of sodium D-isoascorbate, ascorbic acid, water-soluble mixed tocopherol powder, rosemary powder and lecithin powder;

the enzyme for promoting digestion and absorption of unsaturated fatty acids in ruminants can be specifically one of or a mixture of more of cellulase, xylanase, β-glucanase, β-mannase, neutral protease and pectinase;

the water-soluble antioxidant weighs 0.5-1.0% of the total weight of the mixed oil, and may specifically weigh 0.5% or 0.75% or 0.91%;

the enzyme for promoting digestion and absorption of unsaturated fatty acids weighs 1-3% of the total weight of the mixed oil, and may specifically weigh 2.3% or 1.23% or 2.5%;

the enzyme for promoting digestion and absorption of unsaturated fatty acids has an enzyme activity of 2000 U/g to 100,000 U/g.

In step 4), the adhesive includes one of or a mixture of more of arabic gum, xanthan gum, gelatin, algin, pectin, dextrin, flour, pregelatinized starch and gluten;

the adhesive is added in the form of a solution, and the adhesive solution can have a mass concentration of 1.0-10%;

the adhesive solution weighs 1.0-10% of the total weight of the mixed powder;

the granulation is achieved by a swing granulator;

the drying can be achieved by one of or a mixture of more of a rounding machine, a fluidized bed, screw heating, a heating rotary instrument, and the like;

In step 5), a solute of the coating material solution can be one of or a mixture of more of carrageenan, locust bean gum, pullulan, sodium alginate, chitosan, algal polysaccharide and hyaluronic acid, and a solvent is water;

a mass concentration of the solute in the coating material solution can be 1-5%; the coating can weigh 10-20% of the core pellets' weight;

the coating is formed in a coating machine;

conditions for coating process in the coating machine are as follows: temperatures of heating and drying are 40-90° C.;

In step 6), the outer coating wall material can be one of or a mixture of more of hydrogenated palm fatty acid, fatty alcohol, monoglyceride, diglyceride, sorbitol palmitate, hydrogenated stearic acid, stearin fat powder and palm fat powder;

the cold spraying can be carried out at a temperature of 0-50° C.; the outer coating wall material used weighs 30-50% of the weight of the core pellets with the first rumen bypass coating.

The compound rumen bypass polyunsaturated fatty acid powder prepared using the method described above also falls within the protection scope of the present invention.

The present invention also provides a method for increasing polyunsaturated fatty acid content of ruminant milk.

The method for increasing polyunsaturated fatty acid content of ruminant milk provided by the present invention comprises: feeding ruminants with everyday feed for ruminants in which the compound rumen bypass polyunsaturated fatty acid powder described above is added.

In the method described above, 200-500 g is added per cow per day; specifically, 250 g can be added per cow per day.

The addition is done mainly by adding the compound polyunsaturated fatty acid powder to everyday feed to prepare TMR everyday feed, which is fed in the morning and evening every day depending on the ranch's actual situation.

Dairy cows are fed with everyday feed in which the compound rumen bypass polyunsaturated fatty acid powder described above is added and thus produce milk rich in polyunsaturated fatty acids, which can be processed into various milk products.

The milk products include pure milk, yoghourt, lactose-free nutritious milk, milk powder, and the like.

The rumen bypass polyunsaturated fatty acid powders prepared in different proportions comprise DHA and ARA as shown below:

| Product series | DHA:ARA | DHA content % | ARA % |
| --- | --- | --- | --- |
| Class I product | 3:1 | 17 | 5 |
| Class II product | 2:1 | 15 | 7 |
| Class III product | 1:1 | 11 | 11 |
| Class IV product | 1:2 | 7 | 15 |
| Class V product | 1:3 | 5 | 17 |

The powders are added to everyday feed in an amount of 250 g/day/cow to prepare TMR everyday feed, which is fed in the morning and evening every day depending on the ranch's actual situation.

The milk produced after the feeding contains polyunsaturated fatty acids in the following specific amounts (in mg/100 mL):

| The DHA content and ARA content of milk (in mg/100 mL) | | | | | | | | |
| --- | --- | --- | --- | --- | --- | --- | --- | --- |
| | Content | | | | | | | |
| | Feeding for 7 d | | Feeding for 14 d | | Feeding for 21 d | | Feeding for 28 d | |
| Product series | DHA | ARA | DHA | ARA | DHA | ARA | DHA | ARA |
| Blank group | 0 | 0 | 0 | 0 | 0 | 0 | 0 | 0 |
| Class I product | 17.3 | 4.5 | 27.9 | 8.4 | 35.6 | 10.3 | 42.3 | 12.8 |
| Class II product | 12.6 | 5.1 | 19.7 | 7.8 | 26.6 | 11.2 | 32.6 | 13.2 |
| Class III product | 11.2 | 10.8 | 16.8 | 15.6 | 23.1 | 22.4 | 26.3 | 25.9 |
| Class IV product | 5.3 | 11.7 | 8.9 | 21.1 | 10.4 | 27.6 | 12.7 | 33.6 |
| Class V product | 5.6 | 18.3 | 9.1 | 28.8 | 12 | 34.6 | 14.2 | 43.8 |

| Butterfat in milk and milk yield indexes | | | | | | | | |
| --- | --- | --- | --- | --- | --- | --- | --- | --- |
| | Content | | | | | | | |
| | Feeding for 7 d | | Feeding for 14 d | | Feeding for 21 d | | Feeding for 28 d | |
| Products series | Butterfat % | Milk yield Kg | Butterfat % | Milk yield Kg | Butterfat % | Milk yield Kg | Butterfat % | Milk yield Kg |
| Blank group | 3.67 | 34 | 3.63 | 32.5 | 3.65 | 33 | 3.62 | 33 |
| Class I product | 3.62 | 33.5 | 3.66 | 34 | 3.68 | 33 | 3.67 | 33.5 |
| Class II product | 3.58 | 34 | 3.61 | 33 | 3.65 | 32.5 | 3.68 | 33 |
| Class III product | 3.64 | 34.5 | 3.63 | 33.5 | 3.67 | 33 | 3.69 | 33.5 |
| Class IV product | 3.7 | 32.5 | 3.68 | 33.5 | 3.72 | 33 | 3.74 | 32 |
| Class V product | 3.65 | 33 | 3.66 | 32 | 3.69 | 33.5 | 3.71 | 32.5 |

According to the present invention, under vacuum conditions, polyunsaturated fatty acid oils are adsorbed by an adsorbent, and the resulting mixture is compounded with a water-soluble antioxidant and an enzyme for promoting digestion and absorption to form a mixed powder; the mixed powder is uniformly granulated with colloid or flour, and polysaccharide is used to form a fixed coating; granules with a coating are allowed to have a rumen bypass coating of fat powder or monoglyceride and diglyceride by using a coating machine. By using the method to form the polyunsaturated fatty acid granules, the polyunsaturated fatty acids can be effectively protected, and the oxidation of the polyunsaturated fatty acid oils is prevented. In addition, compounding ARA and DHA in a certain ratio can effectively promote the conversion and accumulation of n–3 and n–6 fatty acids in ruminants. The polyunsaturated fatty acid content of ruminant milk is increased, and it is ensured that the butterfat content of milk and the milk yield do not decrease, which provides an basis for the industrialization of natural polyunsaturated fatty acid yoghourt.

With the present invention, the polyunsaturated fatty acid content of ruminant milk can be increased due to the fact that n–3 and n–6 polyunsaturated fatty acids can effectively promote each other in a certain ratio range and thus the conversion of the polyunsaturated fatty acids is improved. According to the present invention, an adsorbent is used to adsorb large amounts of both DHA and ARA; after adsorption, a proper amount of a suitable enzyme is added, and the mixture is well mixed and granulated with an adhesive; polysaccharide is used to form a fixed coating, and finally a rumen bypass coating of fat powder is formed to obtain a rumen bypass high-conversion polyunsaturated fatty acid powder which increases the polyunsaturated fatty acid content, such as the DHA content and ARA content, of butterfat and milk of ruminants. The present invention does not involve use of expensive coating wall materials such as food-grade whey powder and sodium caseinate and use of organic solvents such as ethanol to dissolve resin, effectively reducing the product costs, shortening the production process and increasing the conversion of polyunsaturated fatty acids and thereby laying foundations for industrial production.

PREFERRED EMBODIMENTS OF THE INVENTION

Unless otherwise stated, the experimental methods in the following examples are all conventional methods.

The present invention is further explained by the description of examples, which, however, are not intended to limit the present invention in any way. Any variations or modifications made based on the teaching of the present invention all fall within the protection scope of the present invention.

The present invention is intended to provide for ruminants a n-3 and n-6 compounded rumen bypass polyunsaturated fatty acid powder. In a certain ratio of n-3 to n-6, the two can mutually promote conversion in ruminant milk, increasing conversion of polyunsaturated fatty acids and thereby providing a method for the industrialization of natural milk which is high in polyunsaturated fatty acid content.

The specific description is as follows:

1) DHA oil and ARA oil (DHA content:ARA content=3:1 to 1:3) and an oil-soluble antioxidant system are completely dissolved and uniformly mixed at room temperature; the oil-soluble antioxidant system weighs 0.1-0.2% of the total weight of the DHA oil and ARA oil.

2) The mixed oil is sprayed into an adsorbent under vacuum (adsorbent:oil=0.6:1 to 1:1, by weight), and adsorption is carried out for 0.5-3.0 h.

3) After complete adsorption, a water-soluble antioxidant and an enzyme for promoting digestion and absorption are added, and the mixture was uniformly mixed to form mixed powder, wherein the water-soluble antioxidant weighs 0.5-1.0% of the mixed oil's total weight, and the enzyme mixture weighs 1-3% of the mixed oil's total weight.

4) An adhesive solution weighing 1.0-10% of the mixed powder's weight is added to the mixed powder for adhesion, wherein the adhesive solute has a concentration of 1-10%. The mixture is granulated with a swing granulator, and the resulting granules are dried.

5) Core pellets are prepared and allowed to have a first rumen bypass coating formed with a coating material solution in a coating machine at low temperatures.

6) The coated core pellets are uniformly mixed with a dissolved outer coating wall material, and the mixture is sized in cold-spraying equipment to form fixed granules, forming a polyunsaturated fatty acid powder finished product.

7) A proper amount of the polyunsaturated fatty acid powder is added to everyday feed without changing the everyday feed, and ruminants are fed with the resulting feed to enrich milk with polyunsaturated fatty acids.

8) The milk rich in polyunsaturated fatty acids can be processed into various milk products.

Example 1

1. DHA oil and ARA oil were mixed in a DHA-to-ARA ratio, by weight, of 3:1 to prepare a mixed oil (100 kg), to which the following oil-soluble antioxidants were added: 50 g of natural mixed tocopherol, 40 g of rosemary, 5 g of lecithin and 30 g of ascorbyl palmitate—that is, the additions weighed 0.125% of the mixed oil's total weight. The mixture was emulsified and uniformly mixed.

2. The oil was drawn in and sprayed onto 80 kg of bran under vacuum at a degree of vacuum of –0.08 MPa, and vacuum adsorption was carried out for 30 min.

3. After complete adsorption, 190 g of sodium D-isoascorbate, 190 g of water-soluble mixed tocopherol powder, 120 g of lecithin powder and 900 g of cellulase, 180 g of β-glucanase, 360 g of β-mannase and 900 g of neutral protease were added, and the mixture was uniformly mixed by stirring (the enzyme activity was 28,461 U/g).

4. To the mixed powder was added 36 kg of a 5% solution of arabic gum, and the mixture was uniformly mixed by stirring and granulated in a swing granulator. The granules were rounded in a rounding machine and dried.

5. After being dried, the granules were coated with a 5% solution of chitosan (360 kg) in a coating machine at a temperature of 70° C. and dried.

6. After a first coating was formed, the temperature of the coating machine was lowered to 30° C., and a secondary coating was formed with 80 kg of hydrogenated palm fatty acid.

7. A compound rumen bypass polyunsaturated fatty acid powder with two coatings (260 kg) was obtained, and the DHA content and ARA content of it were 17% and 5%, respectively. The powder was class I product.

8. The class I product was added to everyday feed in an amount of 250 g/cow to prepare TMR everyday feed, which was fed in the morning and evening every day depending on the ranch's actual situation.

9. The milk produced by the cows fed was sampled for indexes such as DHA and butterfat 7 d, 14 d, 21 d and 28 d after feeding.

10. The obtained milk rich in polyunsaturated fatty acids DHA and ARA could be used for producing milk products such as pure milk, milk powder, yogurt and lactose-free milk.

Example 2

1. DHA oil and ARA oil were mixed in a DHA-to-ARA ratio, by weight, of 1:3 to prepare a mixed oil (100 kg), to which the following oil-soluble antioxidants were added: 50 g of natural mixed tocopherol, 40 g of rosemary, 5 g of lecithin and 30 g of ascorbyl palmitate—that is, the additions weighed 0.125% of the mixed oil's total weight. The mixture was emulsified and uniformly mixed.

2. The oil was drawn in and sprayed onto 70 kg of corncob powder under vacuum at a degree of vacuum of –0.08 MPa, and vacuum adsorption was carried out for 90 min.

3. After complete adsorption, 200 g of sodium D-isoascorbate, 400 g of water-soluble mixed tocopherol powder, 150 g of lecithin powder and 480 g of cellulase, 100 g of β-glucanase, 150 g of β-mannase and 500 g of neutral protease were added, and the mixture was uniformly mixed by stirring (the enzyme activity was 29,735 U/g).

4. To the mixed powder was added 15 kg of a 5% solution of arabic gum, and the mixture was uniformly mixed by stirring and granulated in a swing granulator. The granules were rounded in a rounding machine and dried.

5. After being dried, the granules were coated with a 4% solution of chitosan (450 kg) in a coating machine at a temperature of 80° C. and dried.

6. After a first coating was formed, the temperature of the coating machine was lowered to 35° C., and a secondary coating was formed with 80 kg of hydrogenated palm fatty acid.

7. A compound rumen bypass polyunsaturated fatty acid powder with two coatings (260 kg) was obtained, and the DHA content and ARA content of it were 5% and 17%, respectively. The powder was class V product.

8. The class V product was added to everyday feed in an amount of 250 g/day/cow to prepare TMR everyday feed, which was fed in the morning and evening every day depending on the ranch's actual situation.

9. The milk produced by the cows fed was sampled for indexes such as DHA and butterfat 7 d, 14 d, 21 d and 28 d after feeding.

10. The obtained milk rich in polyunsaturated fatty acids DHA and ARA could be used for producing milk products such as pure milk, milk powder, yogurt and lactose-free milk.

Example 3

1. DHA oil and ARA oil were mixed in a DHA-to-ARA ratio, by weight, of 1:1 to prepare a mixed oil (100 kg), to which the following oil-soluble antioxidants were added: 75 g of natural mixed tocopherol, 60 g of rosemary, 8 g of lecithin and 45 g of ascorbyl palmitate—that is, the additions weighed 0.188% of the mixed oil's total weight. The mixture was emulsified and uniformly mixed.

2. The oil was drawn in and sprayed onto 90 kg of wheat germ powder under vacuum at a degree of vacuum of –0.1 MPa, and vacuum adsorption was carried out for 160 min.

3. After complete adsorption, 250 g of sodium D-isoascorbate, 500 g of water-soluble mixed tocopherol powder, 160 g of lecithin powder and 1000 g of cellulase, 200 g of β-glucanase, 300 g of β-mannase and 1000 g of neutral protease were added, and the mixture was uniformly mixed by stirring (the enzyme activity was 40,600 U/g).

4. To the mixed powder was added 10 kg of a 5% solution of arabic gum, and the mixture was uniformly mixed by stirring and granulated in a swing granulator. The granules were rounded in a rounding machine and dried.

5. After being dried, the granules were coated with a 5% solution of chitosan (400 kg) in a coating machine at a temperature of 90° C. and dried.

6. After a first coating was formed, the temperature of the coating machine was lowered to 20° C., and a secondary coating was formed with 70 kg of hydrogenated palm fatty acid.

7. A compound rumen bypass polyunsaturated fatty acid powder with two coatings (250 kg) was obtained, and the DHA content and ARA content of it were 11% and 11%, respectively. The powder was class III product.

8. The class III product was added to everyday feed in an amount of 250 g/day/cow to prepare TMR everyday feed, which was fed in the morning and evening every day depending on the ranch's actual situation.

9. The milk produced by the cows fed was sampled for indexes such as DHA and butterfat 7 d, 14 d, 21 d and 28 d after feeding.

10. The obtained milk rich in polyunsaturated fatty acids DHA and ARA could be used for producing milk products such as pure milk, milk powder, yogurt and lactose-free milk.

Comparative Example 1

1. To 100 kg of DHA oil were added the following oil-soluble antioxidants: 50 g of natural mixed tocopherol, 40 g of rosemary, 5 g of lecithin and 30 g of ascorbyl palmitate—that is, the additions weighed 0.125% of the DHA oil's weight. The mixture was emulsified and uniformly mixed.

2. The oil was drawn in and sprayed onto 80 kg of bran under vacuum at a degree of vacuum of –0.08 MPa, and vacuum adsorption was carried out for 30 min.

3. After complete adsorption, 190 g of sodium D-isoascorbate, 190 g of water-soluble mixed tocopherol powder, 120 g of lecithin powder and 900 g of cellulase, 180 g of β-glucanase, 360 g of β-mannase and 900 g of neutral protease were added, and the mixture was uniformly mixed by stirring (the enzyme activity was 28,461 U/g).

4. To the mixed powder was added 36 kg of a 5% solution of arabic gum, and the mixture was uniformly mixed by stirring and granulated in a swing granulator. The granules were rounded in a rounding machine and dried.

5. After being dried, the granules were coated with a 5% solution of chitosan (360 kg) in a coating machine at a temperature of 70° C. and dried.

6. After a first coating was formed, the temperature of the coating machine was lowered to 30° C., and a secondary coating was formed with 80 kg of hydrogenated palm fatty acid.

7. A compound rumen bypass polyunsaturated fatty acid powder with two coatings (260 kg) was obtained, and the DHA content of it was 17%. The powder was class VI product.

8. The class VI product was added to everyday feed in an amount of 250 g/cow to prepare TMR everyday feed, which was fed in the morning and evening every day depending on the ranch's actual situation.

9. The milk produced by the cows fed was sampled for indexes such as DHA and butterfat 7 d, 14 d, 21 d and 28 d after feeding.

10. The obtained milk rich in polyunsaturated fatty acid DHA could be used for producing milk products such as pure milk, milk powder, yogurt and lactose-free milk.

Comparative Example 2

1. To 100 kg of ARA oil were added the following oil-soluble antioxidants: 50 g of natural mixed tocopherol, 40 g of rosemary, 5 g of lecithin and 30 g of ascorbyl palmitate—that is, the additions weighed 0.125% of the ARA oil's weight. The mixture was emulsified and uniformly mixed.

2. The oil was drawn in and sprayed onto 70 kg of corncob powder under vacuum at a degree of vacuum of –0.08 MPa, and vacuum adsorption was carried out for 90 min.

3. After complete adsorption, 200 g of sodium D-isoascorbate, 400 g of water-soluble mixed tocopherol powder, 150 g of lecithin powder and 480 g of cellulase, 100 g of β-glucanase, 150 g of β-mannase and 500 g of neutral protease were added, and the mixture was uniformly mixed by stirring (the enzyme activity was 29,735 U/g).

4. To the mixed powder was added 15 kg of a 5% solution of arabic gum, and the mixture was uniformly mixed by stirring and granulated in a swing granulator. The granules were rounded in a rounding machine and dried.

5. After being dried, the granules were coated with a 4% solution of chitosan (450 kg) in a coating machine at a temperature of 80° C. and dried.

6. After a first coating was formed, the temperature of the coating machine was lowered to 35° C., and a secondary coating was formed with 80 kg of hydrogenated palm fatty acid.

7. A compound rumen bypass polyunsaturated fatty acid powder with two coatings (260 kg) was obtained, and the ARA content of it was 17%. The powder was class VII product.

8. The class VII product was added to everyday feed in an amount of 250 g/day/cow to prepare TMR everyday feed, which was fed in the morning and evening every day depending on the ranch's actual situation.

9. The milk produced by the cows fed was sampled for indexes such as DHA, ARA and butterfat 7 d, 14 d, 21 d and 28 d after feeding.

10. The obtained milk rich in polyunsaturated fatty acid ARA could be used for producing milk products such as pure milk, milk powder, yogurt and lactose-free milk.

Comparative Example 3

1. DHA oil and ARA oil were mixed in a DHA-to-ARA ratio, by weight, of 4:1 to prepare a mixed oil (100 kg), to which the following oil-soluble antioxidants were added: 50 g of natural mixed tocopherol, 40 g of rosemary, 5 g of lecithin and 30 g of ascorbyl palmitate—that is, the additions weighed 0.125% of the mixed oil's total weight. The mixture was emulsified and uniformly mixed.

2. The oil was drawn in and sprayed onto 80 kg of bran under vacuum at a degree of vacuum of –0.08 MPa, and vacuum adsorption was carried out for 30 min.

3. After complete adsorption, 190 g of sodium D-isoascorbate, 190 g of water-soluble mixed tocopherol powder, 120 g of lecithin powder and 900 g of cellulase, 180 g of β-glucanase, 360 g of β-mannase and 900 g of neutral protease were added, and the mixture was uniformly mixed by stirring (the enzyme activity was 28,461 U/g).

4. To the mixed powder was added 36 kg of a 5% solution of arabic gum, and the mixture was uniformly mixed by stirring and granulated in a swing granulator. The granules were rounded in a rounding machine and dried.

5. After being dried, the granules were coated with a 5% solution of chitosan (360 kg) in a coating machine at a temperature of 70° C. and dried.

6. After a first coating was formed, the temperature of the coating machine was lowered to 30° C., and a secondary coating was formed with 80 kg of hydrogenated palm fatty acid.

7. A compound rumen bypass polyunsaturated fatty acid powder with two coatings (260 kg) was obtained, and the DHA content and ARA content of it were 18% and 4%, respectively. The powder was class VIII product.

8. The class VIII product was added to everyday feed in an amount of 250 g/cow to prepare TMR everyday feed, which was fed in the morning and evening every day depending on the ranch's actual situation.

9. The milk produced by the cows fed was sampled for indexes such as DHA and butterfat 7 d, 14 d, 21 d and 28 d after feeding.

10. The obtained milk rich in polyunsaturated fatty acids DHA and ARA could be used for producing milk products such as pure milk, milk powder, yogurt and lactose-free milk.

Comparative Example 4

1. DHA oil and ARA oil were mixed in a DHA-to-ARA ratio, by weight, of 1:4 to prepare a mixed oil (100 kg), to which the following oil-soluble antioxidants were added: 50 g of natural mixed tocopherol, 40 g of rosemary, 5 g of lecithin and 30 g of ascorbyl palmitate—that is, the additions weighed 0.125% of the mixed oil's total weight. The mixture was emulsified and uniformly mixed.

2. The oil was drawn in and sprayed onto 70 kg of corncob powder under vacuum at a degree of vacuum of –0.08 MPa, and vacuum adsorption was carried out for 90 min.

3. After complete adsorption, 200 g of sodium D-isoascorbate, 400 g of water-soluble mixed tocopherol powder, 150 g of lecithin powder and 480 g of cellulase, 100 g of β-glucanase, 150 g of β-mannase and 500 g of neutral protease were added, and the mixture was uniformly mixed by stirring (the enzyme activity was 29,735 U/g).

4. To the mixed powder was added 15 kg of a 5% solution of arabic gum, and the mixture was uniformly mixed by stirring and granulated in a swing granulator. The granules were rounded in a rounding machine and dried.

5. After being dried, the granules were coated with a 4% solution of chitosan (450 kg) in a coating machine at a temperature of 80° C. and dried.

6. After a first coating was formed, the temperature of the coating machine was lowered to 35° C., and a secondary coating was formed with 80 kg of hydrogenated palm fatty acid.

7. A compound rumen bypass polyunsaturated fatty acid powder with two coatings (260 kg) was obtained, and the DHA content and ARA content of it were 4% and 18%, respectively. The powder was class IX product.

8. The class IX product was added to everyday feed in an amount of 250 g/day/cow to prepare TMR everyday feed, which was fed in the morning and evening every day depending on the ranch's actual situation.

9. The milk produced by the cows fed was sampled for indexes such as DHA and butterfat 7 d, 14 d, 21 d and 28 d after feeding.

10. The obtained milk rich in polyunsaturated fatty acids DHA and ARA could be used for producing milk products such as pure milk, milk powder, yogurt and lactose-free milk.

A rumen bypass polyunsaturated fatty acid powder with a DHA-to-ARA ratio, by weight, of 2:1 and one with 1:2 were prepared by making reference to Example 1 and added to everyday feed in an amount of 250 g/cow/day to prepare TMR everyday feed. The specific method is described below.

1. Basic everyday feed: concentrate+roughage (the cattle farm's original feeding conditions were kept everyday: 10 kg of concentrate, 30 kg of roughage: conventional raw materials of feed such as alfalfa, oat and silage corn).

2. Selection of dairy cows

Healthy dairy cows weighing about 650 kg, having similar body conditions and averaging about 100 d in milk were selected.

3. Feeding period

During the whole feeding period, 250 g of the feed of the present invention was added to basic everyday feed to prepare TMR everyday feed, which was fed in the morning, at noon and in the evening every day depending on the ranch's actual situation.

4. Milk sampling

Criteria for milk sampling: at the beginning of feeding, the milk of each cow was sampled for milk composition and polyunsaturated fatty acids in a morning-to-noon-to-evening ratio of 4:3:3 every 7 days.

The milk produced after the feeding contains polyunsaturated fatty acids in the following specific amounts (in mg/100 mL):

| The DHA content and ARA content of milk (in mg/100 mL) | | | | | | | |
|---|---|---|---|---|---|---|---|
| | Content | | | | | | |
| | Feeding for 7 d | | Feeding for 14 d | | Feeding for 21 d | | Feeding for 28 d | |
| Product series | DHA | ARA | DHA | ARA | DHA | ARA | DHA | ARA |
| Blank group | 0 | 0 | 0 | 0 | 0 | 0 | 0 | 0 |
| Class I product | 17.3 | 4.5 | 27.9 | 8.4 | 35.6 | 10.3 | 42.3 | 12.8 |
| Class II product | 12.6 | 5.1 | 19.7 | 7.8 | 26.6 | 11.2 | 32.6 | 13.2 |

-continued

| The DHA content and ARA content of milk (in mg/100 mL) | | | | | | | |
|---|---|---|---|---|---|---|---|
| | Content | | | | | | |
| | Feeding for 7 d | | Feeding for 14 d | | Feeding for 21 d | | Feeding for 28 d | |
| Product series | DHA | ARA | DHA | ARA | DHA | ARA | DHA | ARA |
| Class III product | 11.2 | 10.8 | 16.8 | 15.6 | 23.1 | 22.4 | 26.3 | 25.9 |
| Class IV product | 5.3 | 11.7 | 8.9 | 21.1 | 10.4 | 27.6 | 12.7 | 33.6 |
| Class V product | 5.6 | 18.3 | 9.1 | 28.8 | 12 | 34.6 | 14.2 | 43.8 |
| Class VI product | 9.3 | 0 | 15.9 | 0 | 19.3 | 0 | 25.4 | 0 |
| Class VII product | 0 | 11.2 | 0 | 16.3 | 0 | 19.4 | 0 | 21.7 |
| Class VIII product | 11.6 | 3.1 | 17.4 | 5.3 | 22.8 | 7.1 | 27.1 | 8.3 |
| Class IX product | 3.3 | 13.6 | 6.8 | 18.1 | 7.3 | 21.8 | 8.5 | 24.4 |

| Butterfat in milk and milk yield indexes | | | | | | | |
|---|---|---|---|---|---|---|---|
| | Content | | | | | | |
| | Feeding for 7 d | | Feeding for 14 d | | Feeding for 21 d | | Feeding for 28 d | |
| Product series | Butterfat % | Milk yield Kg | Butterfat % | Milk yield Kg | Butterfat % | Milk yield Kg | Butterfat % | Milk yield Kg |
| Blank group | 3.67 | 34 | 3.63 | 32.5 | 3.65 | 33 | 3.62 | 33 |
| Class I product | 3.62 | 33.5 | 3.66 | 34 | 3.68 | 33 | 3.67 | 33.5 |
| Class II product | 3.58 | 34 | 3.61 | 33 | 3.65 | 32.5 | 3.68 | 33 |
| Class III product | 3.64 | 34.5 | 3.63 | 33.5 | 3.67 | 33 | 3.69 | 33.5 |
| Class IV product | 3.7 | 32.5 | 3.68 | 33.5 | 3.72 | 33 | 3.74 | 32 |
| Class V product | 3.65 | 33 | 3.66 | 32 | 3.69 | 33.5 | 3.71 | 32.5 |
| Class VI product | 3.5 | 33.5 | 3.57 | 33.5 | 3.54 | 34 | 3.49 | 33.5 |
| Class VII product | 3.46 | 34 | 3.47 | 33.5 | 3.52 | 33.5 | 3.51 | 34 |
| Class VIII product | 3.42 | 34 | 3.46 | 35 | 3.49 | 34.5 | 3.46 | 34 |
| Class IX product | 3.47 | 33 | 3.51 | 34.5 | 3.48 | 34.5 | 3.48 | 34 |

With the present invention, the polyunsaturated fatty acid content of ruminant milk can be increased due to the fact that n−3 and n−6 polyunsaturated fatty acids can effectively promote each other in a certain ratio range and thus the conversion of the polyunsaturated fatty acids is improved. According to the present invention, an adsorbent is used to adsorb large amounts of both DHA and ARA; after adsorption, a proper amount of a suitable enzyme is added, and the mixture is well mixed and granulated with an adhesive; polysaccharide is used to form a fixed coating, and finally a rumen bypass coating of fat powder is formed to obtain a rumen bypass high-conversion polyunsaturated fatty acid powder which increases the polyunsaturated fatty acid content, such as the DHA content and ARA content, of butterfat and milk of ruminants. The present invention does not involve use of expensive coating wall materials such as food-grade whey powder and sodium caseinate and use of organic solvents such as ethanol to dissolve resin, effectively reducing the product costs, shortening the production process and increasing the conversion of polyunsaturated fatty acids and thereby laying foundations for industrial production.

INDUSTRIAL APPLICATIONS

With the present invention, the polyunsaturated fatty acid content of ruminant milk can be increased due to the fact that n−3 and n−6 polyunsaturated fatty acids can effectively promote each other in a certain ratio range and thus the conversion of the polyunsaturated fatty acids is improved.

According to the present invention, an adsorbent is used to adsorb large amounts of both DHA and ARA; after adsorption, a proper amount of a suitable enzyme is added, and the mixture is well mixed and granulated with an adhesive; polysaccharide is used to form a fixed coating, and finally a rumen bypass coating of fat powder is formed to obtain a rumen bypass high-conversion polyunsaturated fatty acid powder which increases the polyunsaturated fatty acid content, such as the DHA content and ARA content, of butterfat and milk of ruminants. The present invention does not involve use of expensive coating wall materials such as food-grade whey powder and sodium caseinate and use of organic solvents such as ethanol to dissolve resin, effectively reducing the product costs, shortening the production process and increasing the conversion of polyunsaturated fatty acids and thereby laying foundations for industrial production.

What is claimed is:

1. A method for preparing a compound rumen bypass polyunsaturated fatty acid powder, comprising the following steps:

1) dissolving and mixing uniformly DHA oil, ARA oil and an oil-soluble antioxidant system to obtain a mixed oil;

2) spraying the mixed oil into an adsorbent under vacuum for adsorption;

3) after complete adsorption, adding a water-soluble antioxidant and an enzyme for promoting digestion and absorption of unsaturated fatty acids, and uniformly mixing the mixture to form a mixed powder;

4) processing the mixed powder obtained into core pellets;

5) coating the core pellets with a coating material solution to form a first rumen bypass coating; and 6) mixing uniformly the coated core pellets with a dissolved outer coating wall material, cold spraying, drying and sizing to form fixed granules to obtain the compound rumen bypass polyunsaturated fatty acid powder finished product, wherein in step 5), a solute of the coating material solution is one of or a mixture of more of carrageenan, locust bean gum, pullulan, chitosan, algal polysaccharide and hyaluronic acid; and in step 6), the outer coating wall material is one of or a mixture of more of hydrogenated palm fatty acid, fatty alcohol, monoglyceride, diglyceride, sorbitol palmitate, hydrogenated stearic acid, stearin fat powder and palm fat powder.

2. The method according to claim 1, wherein in step 1), a ratio, by mass, of DHA to ARA=3:1 to 1:3.

3. The method according to claim 1, wherein in step 1), the oil-soluble antioxidant system is one of or a mixture of more of natural mixed tocopherol, lecithin, rosemary and ascorbyl palmitate;

the oil-soluble antioxidant system weighs 0.1-0.2% of the total weight of the DHA oil and ARA oil;

the dissolving and uniform mixing are carried out at room temperature; in step 2), the degree of vacuum is −0.06 MPa to −0.1 MPa;

the adsorbent includes one of or a mixture of more of zeolite powder, attapulgite, sepiolite, diatomite, white carbon black, vermiculite, montmorillonite powder, bentonite, activated carbon, corncob powder, core starch, soybean fine powder, wheat germ powder, bran, chaff, defatted rice bran and alfalfa powder;

a ratio, by weight, of the adsorbent to the oils is 0.6:1 to 1:1; and the adsorption is carried out for a period of 0.5-3.0 h.

4. The method according to claim 1, wherein in step 3), the water-soluble antioxidant is one of or a mixture of more of sodium D-isoascorbate, ascorbic acid, water-soluble mixed tocopherol powder, rosemary powder and lecithin powder;

the enzyme for promoting digestion and absorption of unsaturated fatty acids is one of or a mixture of more of cellulase, xylanase, β-glucanase, β-mannase; neutral protease and pectinase;

the water-soluble antioxidant weighs 0.5-1.0% of the total weight of the mixed oil;

the enzyme for promoting digestion and absorption of unsaturated fatty acids weighs 1-3% of the total weight of the mixed oil; and the enzyme for promoting digestion and absorption of unsaturated fatty acids has an enzyme activity of 2000 U/g to 100,000 U/g.

5. The method according to claim 1, wherein step 4) is done by adding an adhesive to the mixed powder for adhesion and carrying out granulation and then drying to obtain core pellets;

the adhesive includes one of or a mixture of more of arabic gum, xanthan gum, gelatin, algin, pectin, dextrin, flour, pregelatinized starch and gluten;

the adhesive is added in the form of a solution, and the adhesive solution has a mass concentration of 1.0-10%; and the adhesive solution weighs 1.0-10% of the total weight of the mixed powder.

6. The method according to claim 1, wherein in step 5), a mass concentration of the solute in the coating material solution is 1-5%; the coating weighs 10-20% of the core pellets' weight; and conditions for coating process in the coating machine are as follows: temperatures of heating and drying are 40-90° C.

7. The method according to claim 1, wherein in step 6), the cold spraying is carried out at a temperature of 0-50° C.; the outer coating wall material used weighs 30-50% of the weight of the core pellets with the first rumen bypass coating.

8. The compound rumen bypass polyunsaturated fatty acid powder prepared using the method according to claim 1.

9. A method for increasing polyunsaturated fatty acid content of ruminant milk, comprising: feeding ruminants with everyday feed for ruminants in which the compound rumen bypass polyunsaturated fatty acid powder according to claim 8 is added.

10. The method according to claim 9, wherein in the method, 200-500 g is added per day per cow; and the addition is done by adding the compound polyunsaturated fatty acid powder to everyday feed to prepare TMR everyday feed and feeding the TMR everyday feed in the morning, at noon and in the evening.

11. The method according to claim 2, wherein in step 1), the oil-soluble antioxidant system is one of or a mixture of more of natural mixed tocopherol, lecithin, rosemary and ascorbyl palmitate;

the oil-soluble antioxidant system weighs 0.1-0.2% of the total weight of the DHA oil and ARA oil;

the dissolving and uniform mixing are carried out at room temperature;

in step 2), the degree of vacuum is −0.06 MPa to −0.1 MPa;

the adsorbent includes one of or a mixture of more of zeolite powder, attapulgite, sepiolite, diatomite, white carbon black, vermiculite, montmorillonite powder, bentonite, activated carbon, corncob powder, core starch, soybean fine powder, wheat germ powder, bran, chaff, defatted rice bran and alfalfa powder;

a ratio, by weight, of the adsorbent to the oils is 0.6:1 to 1:1; and the adsorption is carried out for a period of 0.5-3.0 h.

12. The method according to claim 2, wherein in step 3), the water-soluble antioxidant is one of or a mixture of more of sodium D-isoascorbate, ascorbic acid, water-soluble mixed tocopherol powder, rosemary powder and lecithin powder;

the enzyme for promoting digestion and absorption of unsaturated fatty acids is one of or a mixture of more of cellulase, xylanase, β-glucanase, β-mannase; neutral protease and pectinase;

the water-soluble antioxidant weighs 0.5-1.0% of the total weight of the mixed oil;

the enzyme for promoting digestion and absorption of unsaturated fatty acids weighs 1-3% of the total weight of the mixed oil; and the enzyme for promoting digestion and absorption of unsaturated fatty acids has an enzyme activity of 2000 U/g to 100,000 U/g.

13. The method according to claim 2, wherein step 4) is done by adding an adhesive to the mixed powder for adhesion and carrying out granulation and then drying to obtain core pellets;

the adhesive includes one of or a mixture of more of arabic gum, xanthan gum, gelatin, algin, pectin, dextrin, flour, pregelatinized starch and gluten;

the adhesive is added in the form of a solution, and the adhesive solution has a mass concentration of 1.0-10%; and the adhesive solution weighs 1.0-10% of the total weight of the mixed powder.

14. The method according to claim 2, wherein in step 5), a mass concentration of the solute in the coating material solution is 1-5%; the coating weighs 10-20% of the core pellets' weight; and conditions for coating process in the coating machine are as follows: temperatures of heating and drying are 40-90° C.

15. The method according to claim 2 wherein in step 6), the cold spraying is carried out at a temperature of 0-50° C.; the outer coating wall material used weighs 30-50% of the weight of the core pellets with the first rumen bypass coating.

* * * * *